Jan. 26, 1965   F. P. ELLIOTT   3,167,256
PHOTOGRAPHIC FLASH APPARATUS
Filed Nov. 29, 1962
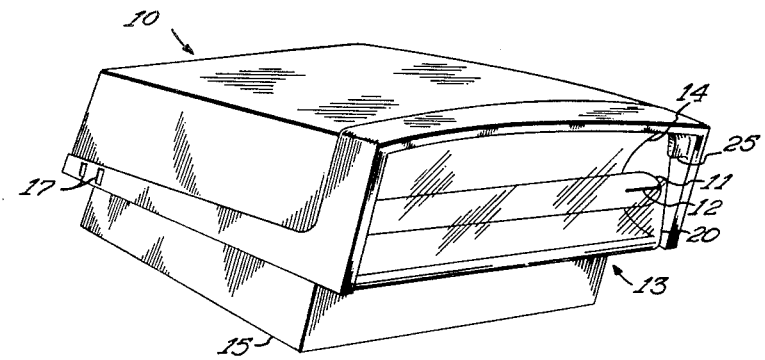
FIG 1
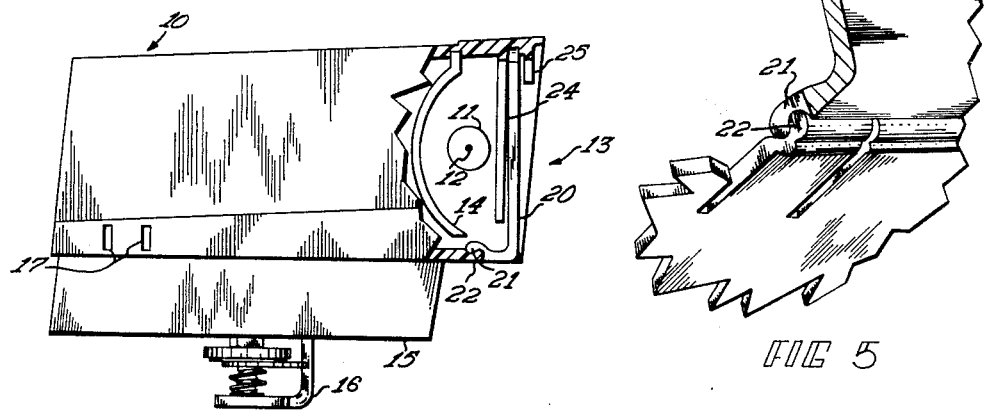
FIG 2
FIG 5
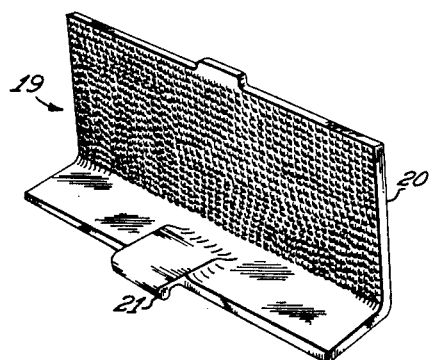
FIG 4
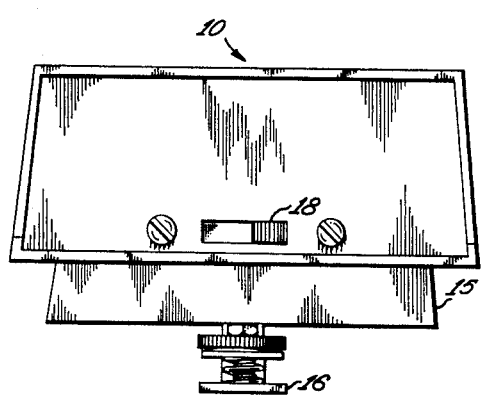
FIG 3
INVENTOR.
FRANKLIN P. ELLIOTT
BY
ATTORNEY United States Patent Office 3,167,256
Patented Jan. 26, 1965

3,167,256
PHOTOGRAPHIC FLASH APPARATUS
Franklin P. Elliott, Denver, Colo., assignor to Honeywell Inc., a corporation of Delaware
Filed Nov. 29, 1962, Ser. No. 240,998
3 Claims. (Cl. 240—1.3)

The present invention is concerned with an improved photographic flash apparatus and particularly with such an apparatus having a removable lens assembly which is constructed and arranged to facilitate selective removal and replacement of a portion of the exterior housing of the flash unit, this portion constituting a lens assembly to control the optical properties of the light emitted by the flash unit.

As the photographic art has progressed, the photographer has found the camera to be a versatile instrument. Depending upon the particular situation which is to be recorded by the photographer, he has a selection of films having quite different light sensitivity properties, many films being suited for particular situations. As a result, the photographer finds that he has no one film which is preferred in all situations. Furthermore, the cameras are many time capable of utilizing, selectively, different lenses to produce, for example, different fields of view. As a result, the viewing angle of the camera can be selectively chosen to suit the particular photographic situation.

When the camera is to be used with artificial flash illumination, to illuminate the subject to be photographed, it is desirable that the associated photographic flash units be as versatile as the camera is versatile. The present invention is concerned with a unique structure providing such versatility with a new and unusual structure in a photographic flash unit.

Specifically, the present invention is concerned with a photographic flash apparatus in which a removable lens assembly forms an integral part of the outer housing of the flash apparatus, and is not a cumbersome attachment which must, in one manner or another, be hung in front of the flash apparatus. In this manner, the removable lens assembly of the present invention not only completes the outer housing, in a pleasantly appearing fashion, but also allows, through the selective use of one of a plurality of such lenses, the matching of the photographic flash apparatus to the camera and to the film then being used in the camera.

The present invention contemplates the use of such an assembly with an electronic photographic flash apparatus in which a gas-filled flash tube is energized in synchronism with the operation of the shutter contacts of an associated camera to cause an arc discharge to exist in the flash tube and to produce a brilliant flash of light in synchronism with the operation of the cemera shutter. The light produced by the flash tube is directed toward the subject to be illuminated by means of a reflector cooperating with the flash tube. This reflector-flash tube structure emits light which, for a majority of the films, closely approximates the natural illumination provided by the sun. However, for other films, with different light sensitivity characteristics, a particular lens of the present invention may be selected having optical properties to change the light emitted by the reflector-flash tube structure to match the light sensitivity of the film then being used in the camera.

Furthermore, it is within the teachings of the present invention to use the unique structure described herein, in which one of the particular lens members may be formed of a material to restrict passage of the light and thus, in a sense, reduce the so-called guide number of the flash unit. Furthermore, when the flash unit is to be used with a camera having a wide angle lens, the particular lens of the present invention may be selected to "scatter" the light produced by the reflector-flash tube combination to produce a cone of light from the photographic flash apparatus which more nearly approximates the viewing cone of the camera, now having a wide angle lens.

The present invention will be apparent to those skilled in the art upon reference to the following specification, claims, and drawings, of which:

FIGURE 1 is a front view of my improved photographic flash apparatus, showing the reflector-flash tube structure as viewed through a clear lens in position to complete the housing of the apparatus, FIGURE 2 is a side view of the structure of FIGURE 1, showing a portion of the front, adjacent the open end, broken away, FIGURE 3 is a rear view of the apparatus of FIGURE 1, FIGURE 4 is a showing of the inside surface of one of the lenses of my invention, showing in particular a lens having a roughened surface to produce scattering of the light, and FIGURE 5 is a partial view of a portion of the housing, and a portion of a lens, showing the mating latching mechanism for mounting a lens to the housing.

Referring specifically to FIGURE 1, reference numeral 10 designates generally the housing of a photographic flash apparatus. As mentioned, this photographic flash apparatus may be of the type including a photographic flash tube 11, such a tube having a pair of oppositely disposed main current conducting electrodes 12, each of which is adapted to be connected to a source of electrical energy, preferably in the form of a high voltage capacitor. The space within housing 10 is adapted to receive the electrical components of such an electronic flash unit and the exact structure to accomplish this forms no part of the present invention.

Housing 10 is generally rectangular in shape and includes a forwardly directed rectangularly shaped open face 13 in which the reflector-flash tube structure is mounted. The reflector is identified by reference numeral 14 and, as can be seen in FIGURE 2, the reflector is mounted within the housing 10 at a position spaced from the rectangular shaped opening 13.

Reference numeral 15 identifies the lower portion of housing 10 and this portion 15 may contain a plurality of low voltage batteries, to operatively energize the electronic flash circuit located within housing 10. At the bottom portion of housing 15 is situated a mounting bracket 16, adapted to cooperate with a photographic camera to facilitate the mounting of the photographic flash apparatus at the camera.

Reference numeral 17 designates generally a connector terminal adapted to be connected to the shutter contacts of an associated camera to facilitate synchronous energization of flash tube 11 and actuation of the shutter of the camera. Reference numeral 18 (see FIGURE 3) identifies an on-off switch to control the operation of the circuit of the electronic flash unit contained within housing 10.

Referring to FIGURE 4, reference numeral 19 designates generally one of the lens members of my invention. As mentioned, it is within the teaching of the present invention to provide a plurality of such lenses, each of these lenses differing somewhat in their optical properties. For simplicity, the lens 20 of FIGURE 4 is shown as one having a series of serrations or a roughened surface to scatter the light to produce a cone of light from the reflector-flash tube combination which approximates the viewing angle of a camera having a wide angle lens. The lens 20, shown in FIGURES 1, 2 and 5, is a smooth surface lens which is formed of clear material. Also such a lens may be formed of a material having a coloring providing particular light transfer and control properties.

Preferably, the housing 10 as well as the individual lenses of the present invention are constructed of a somewhat resilient plastic-like material.

As seen in FIGURE 4, the lens has a generally rectangular shape, corresponding to the rectangular shape of the opening 13 formed in housing 10. The lens is also provided with a latch member 21 cooperating with a latch member 22 provided at the bottom portion of the housing 10, adjacent the opening 13. In FIGURE 5, an enlarged view is shown, showing that member 22 is formed as a tongue having a ridge and a groove to mate with the ridge and groove of the latching member 21 formed as a portion of the lens. Since the members 21 and 22 are preferably formed of a resilient plastic, the structure may be deformed slightly to release the latching members 21 and 22 to facilitate removal and replacement of the lens with a lens having a different optical property, as selected by the photographer.

To facilitate placement of a particular lens to close the opening 13 formed in the housing 10 of the flash unit, a first generally U-shaped positioning ridge 24 is provided. This U-shaped ridge is formed on the interior surface of housing 10 adjacent the opening 13 and extends out a short distance from the inner surface of the walls of the housing. As viewed in FIGURE 1, the U-shaped portion of ridge 24 constitutes a relatively long portion across the inner top of opening 13 and two joining, relatively short legs extending down the inner surface of housing 10. In FIGURE 2, the left-hand portion of the U-shaped member 24, as viewed in FIGURE 1, has been cut away, the portion across the inner top is seen in section, and the right-hand portion is shown in full view.

Reference numeral 25 identifies a second positioning ridge which is spaced forward of the first positioning ridge 24 and closer to the opening 13. Here again, positioning ridge 25 is formed as an integral portion of the inside surface of housing 10 and includes a mating, relatively long portion extending along the interior top of housing 10, as seen in section in FIGURE 1, and two short legs extending down the inner surface of the sides of housing 10, as viewed in FIGURE 1. Here again, the left-hand, relatively short leg portion of positioning ridge 25 has been cut away in FIGURE 2, and the right-hand leg portion is shown in full view.

From the above description, it can be seen that a particular selected lens, selectively determined by the photographer, may be inserted into position by sliding the lens into the space defined by the positioning ridges 24 and 25, and then slightly distorting the lens to facilitate latching of the members 21 and 22. The result is to provide a complete housing 10, now closed at opening 13, in a manner which is functional and yet pleasing in appearance.

Modifications of the present invention will be apparent to those skilled in the art and it is thus intended that the scope of the present invention be limited by the scope of the appended claims.

I claim as my invention:
1. A photographic flash unit comprising:
an open end housing facilitating the enclosure of the electrical components of a photographic flash unit and having a generally rectangular open end,
a reflector-flash tube structure mounted within said housing at a position spaced from the open end thereof, and directed toward the open end to direct light toward the open end,
a generally U-shaped positioning ridge formed on the interior surface of said housing in the vicinity of the open end thereof,
a second positioning ridge formed on the interior surface of said housing in the vicinity of the open end thereof and at a position spaced from said U-shaped ridge,
a flexible locking tab formed as a portion of said housing in the vicinity of the open end thereof and at the portion of said open end which is generally opposite said U-shaped positioning ridge,
a removable lens having a generally rectangular shape to mate with the rectangular open end of said housing,
and a mating locking tab formed as a portion of said lens, said lens being removably mounted within the open end of said housing by the positioning of said lens between said ridges and by the interengagement of said locking tabs.

2. A photographic flash unit comprising
a housing having an open end of a predetermined shape,
a reflector-flash tube structure mounted within said housing at a position spaced from said open end to direct light toward said open end,
a pair of spaced positioning ridges formed on the interior surface of said housing in the vicinity of said open end,
a flexible locking tab formed as a portion of said housing in the vicinity of said open end and in a position generally opposite to said ridges,
a removable lens having a shape to mate with that of said open end, and
a mating locking tab formed as a portion of said lens,
said lens being removably mounted within said open end by the positioning of said lens between said ridges and by the interengagement of said locking tabs.

3. A photographic flash unit comprising
a housing having an open end,
a reflector mounted within said housing and facing said open end,
means to support a photographic light source in cooperative relation with said reflector,
a removable lens having a shape to conform to that of said open end, and
means to mount said lens in said housing to close said open end, said means including
a pair of spaced positioning ridges formed on the interior surface of said housing in the vicinity of said open end,
a first locking tab formed as a portion of said housing in the vicinity of said open end and in a position generally opposite to said ridges, and
a mating locking tab formed as a portion of said lens, said lens being removably mounted within said open end by the positioning of said lens between said ridges, and by the interengagement of said locking tabs.

References Cited in the file of this patent
UNITED STATES PATENTS

| | | |
|---|---|---|
| 2,441,489 | Jacobs | May 11, 1948 |
| 2,510,873 | Early | June 6, 1950 |
| 2,614,783 | Spear | Oct. 21, 1952 |
| 2,747,076 | Eloranta | May 22, 1956 |
| 2,918,570 | Diedring | Dec. 22, 1959 |
| 3,049,613 | Baldwin | Aug. 14, 1962 |
| 3,077,534 | Brandt | Feb. 12, 1963 |